United States Patent [19]

Seide

[11] 4,028,031

[45] June 7, 1977

[54] SCREW EXTRUDER AND CALENDER ASSEMBLAGE

[75] Inventor: Adolf Seide, Bissingen, Enz, Germany

[73] Assignee: Werner & Pfleiderer, Stuttgart-Feuerbach, Germany

[22] Filed: Dec. 8, 1975

[21] Appl. No.: 638,638

[30] Foreign Application Priority Data

Dec. 11, 1974 Germany .......................... 2458614

[52] U.S. Cl. .............................. 425/147; 264/40.4; 425/327; 425/DIG. 235

[51] Int. Cl.² ........................................... B29C 3/06

[58] Field of Search .......... 425/113, 114, 145, 147, 425/325, 327, DIG. 235, 131.1; 72/366, 256, 10, 16; 264/176 R, 284, 40.7, 40.4

[56] References Cited

UNITED STATES PATENTS 2,382,177  8/1945  Schanz ........................ 425/131.1
3,947,201  3/1976  Ellwood ...................... 425/327 X

*Primary Examiner*—Francis S. Husar
*Assistant Examiner*—Mark Rosenbaum
*Attorney, Agent, or Firm*—Hane, Sullivan & Spiecens

[57] ABSTRACT

A screw extruder-calender assemblage consists of a screw extruder and a pair of calender rolls disposed adjacent to the discharge end of the extruder and normal to the lengthwise axis thereof. An equalization chamber between the extruder discharge end and the input side of the calender rolls is formed by the discharge crosswise end of the extruder, peripheral positions of the calender rolls and two side walls; the crosswise width of the chamber adjacent to the calender being equal to the length of the working gap. The quantity of material in this chamber during operation varies with variations in the output of the extruder but always provides a quantity of material sufficient to assure uniform output from the calender rolls.

6 Claims, 3 Drawing Figures

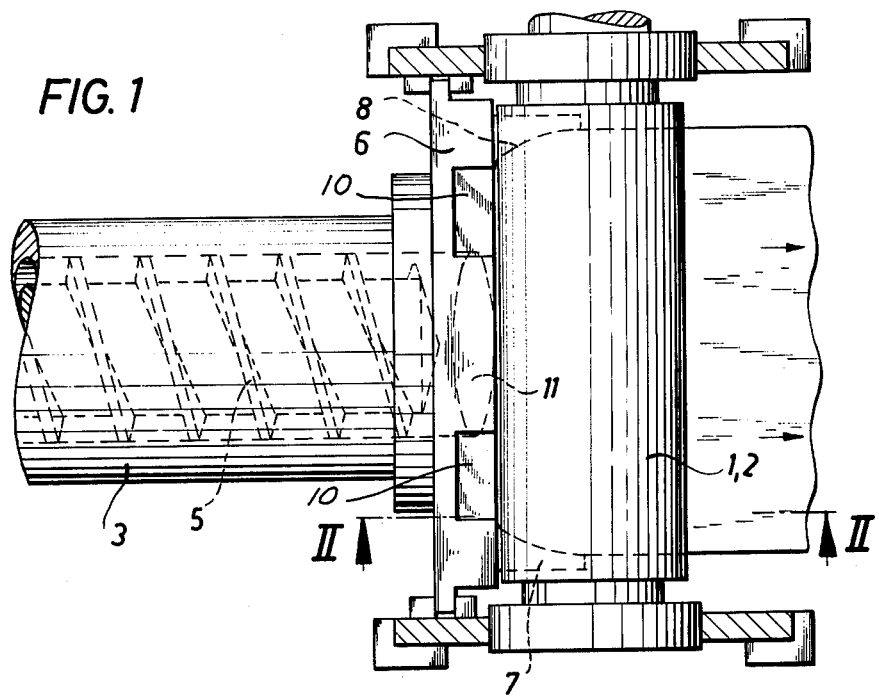
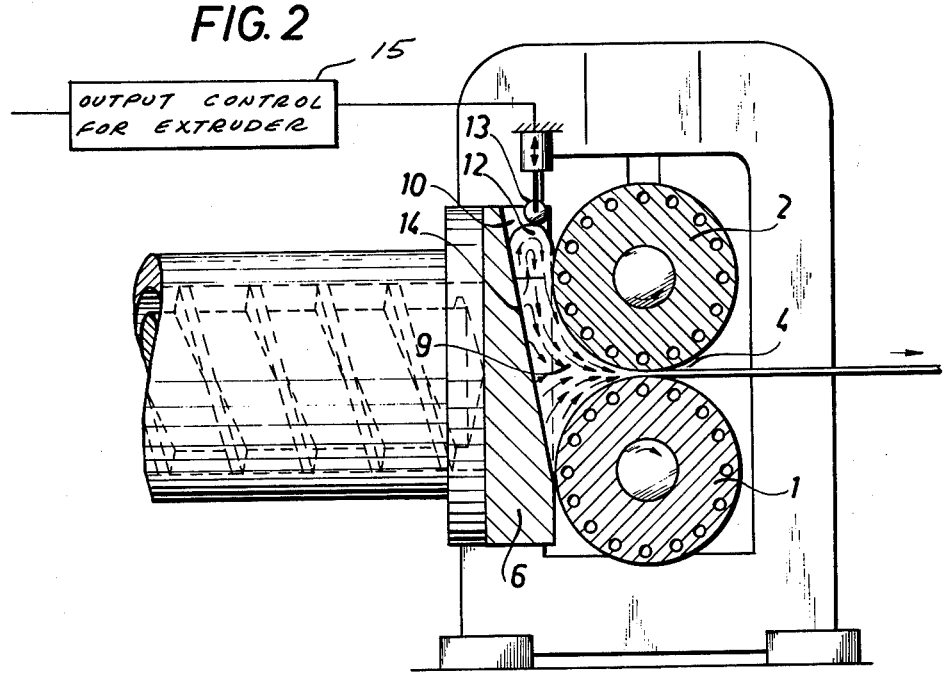

SCREW EXTRUDER AND CALENDER ASSEMBLAGE

The present invention relates to a screw extruder-calender assemblage for producing plates and sheets or foil from pliable material, and more particularly to an assemblage of this type which is equipped with means for equalizing the effect of variations in the output of the extruder upon the output of the calender.

BACKGROUND

There are known screw extruder-calender assemblages in which the effect of variations of the extruder output are equalized by providing between the output end of the extruder and the input side of the calender rolls wall portions which extend from the extruder end to the calender rolls within the input range thereof. Equalization means of this kind have not been found satisfactory for several reasons which will be pointed out hereinafter.

The transfer of the extruder output to the calender rolls must be continuous and with a uniform supply of material as otherwise the quality of rolled-out plates and sheets or foils is affected and thus also the results of subsequent processing of the rolled-out material.

The input space provided between the discharge end of the extruder and the calender rolls serves to effect a uniform transfer of material and also a uniform with of the rolled-out material. If now an increase of the extruder output occurs, the uniformity of the rolled-out material is adversely affected and there is also the danger of overloading of machinery in the assemblage by temporary pressure build up in the input space.

The output of the extruder even if the rpm of the extruder screws remains the same, generally does not remain constant but is subjected to variations. Equalization devices as now known provide means which are designed to equalize the quantities of extruded material within a given time unit.

According to published German patent application 1,704,640 (DT-As 1,704,640) a screw extruder-calender combination is provided with a flexible connection between a displaceable frame structure for the rolls and the screw extruder. such flexible connection serves to compensate by yielding possible excess pressure between the discharge end in the extruder and the input side of the calender rolls.

An equalization device of this type is inherently complex and thus likely to have frequent breakdowns. It is particularly disadvantageous that due to displacement of the frame structure mounting the calender rolls. The lateral limitation of the input range of the calender rolls retracts whereby the effective length of the working gap of the calender is uncontrollably enlarged. Variations in the width of the working gap results in corresponding changes in the width of the rolled-out plates and sheets or foils which in turn causes diffuculties with the subsequent operations to which the output of the calender is to be subjected.

According to German patent 971,776 (DT-PS 971,776) equalization of pressure changes in the feed of material is effected by providing at lateral circularly curved cut-outs of the side walls of the discharge end of the extruder sensors which sense the rolled-out material emerging from the cut-outs. As a result of such sensing, the drive for devices used for further processing of the rolled-out material is controlled corrsponding to sensed changes in the output.

Such mode of equalization has the disadvantage that a continuously irregular run is effected, not only of the extruder but also of the calender rolls. Moreover, it is necessary also to regulate the running of the devices used for further processing the rolled-out material.

THE INVENTION

It is a broad object of the invention to provide a novel and improved screw extruder-calender assemblage in which output variations in the output of the extruder and the assemblage are compensated without requiring adjusting devices used in the operation of the assemblage or devices used for subsequent processing of the rolled-out material and also without varying the effective width of the working gap calender and also without varying of the thickness of the gap and thus of the thickness of the rolled-out material.

Another object of the invention is to provide a novel and improved screw extruder-calender assemblage including pressure equalizing means of the general type above referred to in which the extruder and the calender of the assemblage are disposed in fixed positions and pressure variations are automatically compensated for by the quantity of material accumulating in an equalization chamber between the discharge end of the extruder and the input side of the calender.

SUMMARY OF THE INVENTION

The aforepointed out objects, features and advantages, and other objects, features and advantages which will be pointed out hereinafter and set forth in the appended claims, are obtained by providing between the discharge end of the extruder and the side of the calender rolls facing the discharge end of the extruder at least one equalization chamber which is defined by the upper calender roll and a peripheral wall portion of the lower calender roll and which has a length extending across the entire input range of the calender rolls. This equalization chamber preferably increases in its with from the lower calender roll toward the upper calender roll and is open at its top. As a result of such chamber, temporary excess output from the extruder is automatically compensated by a temporary increase of the quantity of material in the chamber.

Due to the rotation of the upper calender roll when the assembalge is in operation, there is automatically formed at the top level of material in the equalization chamber an also rotating generally roll-shaped bulge. The level of such bulge depends on the extent to which the equalization chamber is filled. The upper calender roll due to its continuous rotation will continuously draw material from the bulge into the working gap thereby maintaining the total quantity of material within the equalization chamber under control. The roll-shaped bulge changes its spatial position and thickness according to the variations of the extruder output very rapidly and is subjected to a continuous withdrawal over a wide layer of its surface. As a result, the feed of material to the calender rolls will not vary.

Correction of the setting of the devices included in the assemblage to effect compensation of pressure changes within the input range of the calender such as changes in the working gap between the rolls or in the spacing between the calender and the discharge end of the extruder are thus not necessary.

According to a further aspect of the invention, a particularly effective drawing of the material forming the roll-shaped bulge can be obtained by giving the equalization chamber a wedge-shaped configuration between the extruder discharge end and the calender rolls and a generally rectangular crosswise configuration as seen parallel to the rolls.

According to another aspect of the invention, two equalization chambers may be provided in side-by-side position, but spaced apart and disposed within the peripheral outline of the opening in the discharge end of the extruder. With such an arrangement, uniform distribution of the flow of material over the entire length of the input range of the calender rolls is obtained even if pliable plastics materials having high viscosity are used.

The invention also provides means for supervising the operational conditions of the assemblage, and more specifically, for providing sensing or probing means which are associated with the equalization chamber and continuously sense the extent of the quantity of material accumulated in the equalization chamber and effect a control of the extruder in response to such sensing. A sensing means of this type can be used, for instance, for correcting misfunctioning caused by insufficient feeding of the extruder which would result in a reduction of the extruder output even though the rpm of the extruder screw remains constant.

BRIEF DESCRIPTION OF THE DRAWING FIGURES

In the accompanying drawing, a preferred embodiment of a screw extruder-calender assemblage according to the invention is shown by way of illustration and not by way of limitation.

In the drawing:

FIG. 1 is a plan view of an exempification of a screw extruder-calender assemblage according to the invention;

FIG. 2 is a section taken on line II—II of FIG. 1; and

DETAILED DESCRIPTION OF THE DRAWING FIGURES

Figure 3:
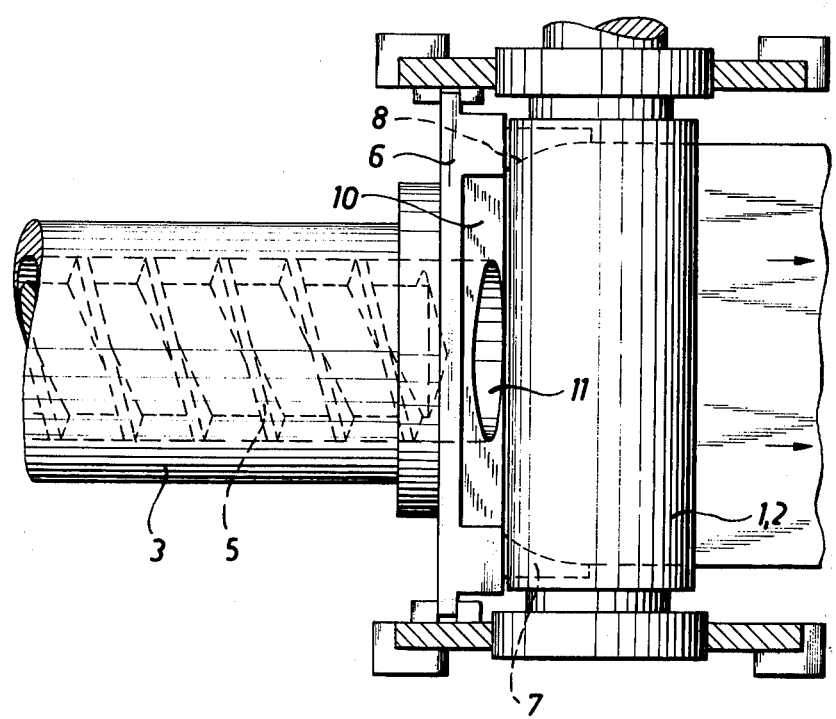
FIG. 3 is a plan view similar to FIG. 1 and showing a modification of the assemblage.

Referring to the figures more in detail, the screw extruder-calender assemblage as exemplified comprises calender rolls 1 and 2 disposed in superimposition and parallel to each other and a screw extruder 3. The material to be extruded and calendered may be a pliable synthetic plastics material. Both, the calender and the screw extruder should be visualized as being of conventional design, that is, an extruder equipped with the standard accessories and screw shapes; the extruder may be a single screw extruder or a twin screw extruder. The rolls of the calender are spaced to form therebetween a working gap 4. The spatial arrangement of the extruder and the calender rolls is so that the extruder is disposed normal to the lengthwise axes of the calender rolls and the center axis the extruder is in axial alignment with working gap 4.

The extruder has at its discharge end a discharge member or nozzle 6 including an opening 11. This discharge member in conjunction with the adjacent peripheral surfaces of calender rolls 1 and 2 and curved side walls 7 and 8 define the intake range 9 for the rolls.

The discharge member 6 has on its side facing the intake range of rolls 1 and 4 a slanted surface 14 (see FIG. 2) which is outwardly taped from the lower end of opening 11 of discharge member 6 and extends past the upper operational range of roll 2 thereby forming equalization chambers 10 of generally wedge-shaped lengthwise configuration. Two such equalization chambers are shown disposed symmetrically relative to the lengthwise axis of the extruder. As is apparent from FIG. 2, the height of each of the equalization chambers 10 extends above the center axis of calender roll 2. As is also apparent from FIG. 2, in the equalization chambers excess material as caused by variations in the output of the extruder will accumulate. If there is excess of material, build-up of material in chambers 10, a roller-like bulge 12 is formed which is continuously drawn into and through gap 4 by the rotation of the upper calender roll 2 when and while the assemblage is in operation.

Assuming now that an increase of the output of the extruder is followed by a phase of reduce extruder output (pulsations), the upper calender roll 2 due to its rotation will first withdraw the excess of material present in the equalization chambers 10 by the temporary excess of the extruder output so that the quantity of material is reduced to its average and normal level.

The afore-described pattern can periodically be repeated. Accordingly, any increase of pressure within the intake range 9 is effectively prevented by the arrangement according to the invention. As it is now apparent, the intake and thus the output of the calender remains constant irrespective of variations in the output of the extruder. As a result, the production of plates and sheets or foils by the assemblage is not affected but remains uniform and thus of equal quality.

In the event that due to temporary reducton of the feed of material to the extruder, the output of the extruder is no longer proportional to the rpm of the extruder screw, such under-feeding of the extruder can be eliminated by providing at the level of the afore-referred to bulge 12 at the top of material in the equalization chamber sensing means 13 which responds to a drop of the level of the bulge and activate a control means 15 which in turn creates the rpm of the extruder screw in accordance with under-feeding of the extruder. Sensing means of the kind here involved may be of the optical or mechanical type; many sensing means suitable for the purpose are known and readily available in the market. Similarly, control means 15 should also be visualized to be conventional; in fact, control means of the kind here involved often constitute part of a standard screw extruder.

FIG. 3 is similar to the assemblage shown in FIGS. 1 and 2 and described in connection therewith, except that only one equalization chamber 10 is provided.

While the invention has been described in detail with respect to certain now preferred examples and embodiments of the invention, it will be understood by those skilled in the art, after understanding the invention, that various changes and modifications may be made without departing from the spirit and scope of the invention, and it is intended, therefore, to cover all such changes and modifications in the appended claims.

What is claimed is:

1. An extruder-calender assemblage for rolling out pliable material in the form of plates and foils or sheets, said assemblage comprising in combination:

a screw extruder having at one end a discharge member including an opening for discharging material to be rolled from the extruder; a calender including a pair of axially parallel and superimposed rolls mounted adjacent to the discharge member of the extruder, said calender rolls being disposed normal to the extruder and having a working gap axially aligned with the center axis of the extruder; the side of the discharge member facing the rolls in conjunction with the peripheral wall surfaces of the calender rolls defining a chamber extending across the entire width of the feed-in gap between said rolls and to the lower end of said opening in the discharge member, the chamber being closed at its end juxtaposed to the lower roll and open at its end juxtaposed to the upper roll and increasing in crosswise width from the lower calender roll toward the upper one; said chamber constituting an equalization chamber for accumlating the material discharged from the extruder and compensating for variations in the quantity of material fed from the extruder to the calender rolls.

2. The extruder-calender assemblage according to claim 1 wherein said equalization chamber has a wedge-shaped configuration crosswise to the axes of the calender rolls and a substantially rectangular configuration in the direction lengthwise to the axes of the calender rolls.

3. The extruder-calender assemblage according to claim 2 wherein the edge of the wedge-shaped equalization chamber engages the peripheral surfaces of the lower calender roll thereby continuously closing the chamber at its lower end.

4. The extruder-calender assemblage according to claim 1 and comprising sensing means responsive to the amount of material in said equalization chamber, and control means controlled by said sensing means for controlling the output of the extruder in accordance with the quantity of material sensed to be in said equalization chamber.

5. The extruder-calender assemblage according to claim 1 wherein a second equalization chamber is provided, said second chamber being disposed spaced apart form the first chamber and parallel to the axes of the calender rolls.

6. The extruder-calender assemblage according to claim 3 wherein said equalization chambers are disposed symmetrically relative to the center axis of the extruder.

* * * * *